May 10, 1932.  P. GOUGE  1,857,686

DEVICE FOR AUTOMATICALLY ADVANCING PERFORATING HAMMERS BY SLIDING ON A SUPPORT

Filed Feb. 8, 1930  6 Sheets-Sheet 1

INVENTOR
Pierre Gouge.
BY Cameron, Kerkam & Sutton
ATTORNEYS

May 10, 1932. P. GOUGE 1,857,686
DEVICE FOR AUTOMATICALLY ADVANCING PERFORATING HAMMERS BY SLIDING ON A SUPPORT
Filed Feb. 8, 1930 6 Sheets-Sheet 2
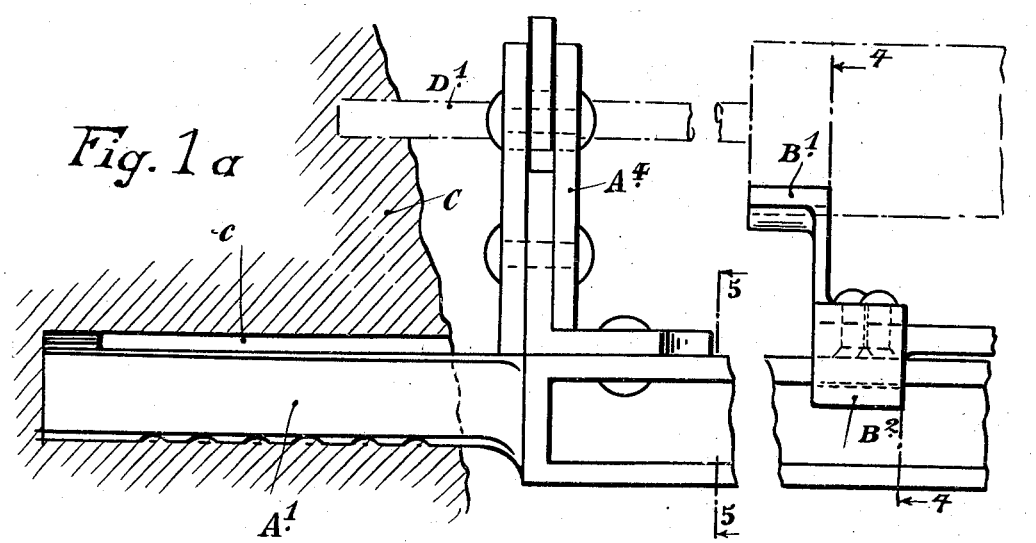
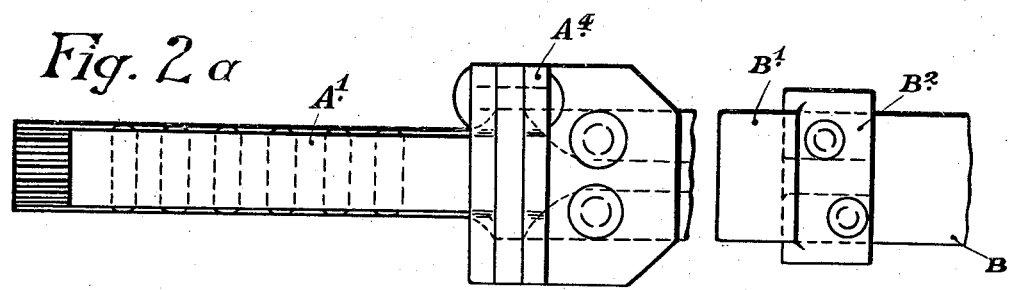
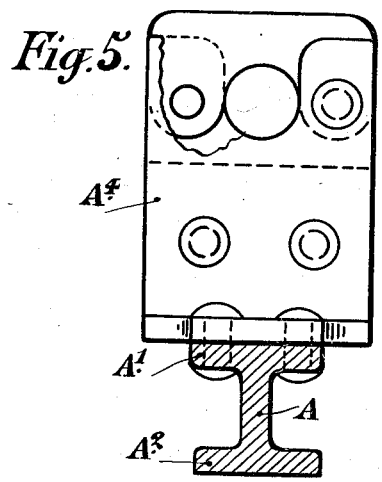
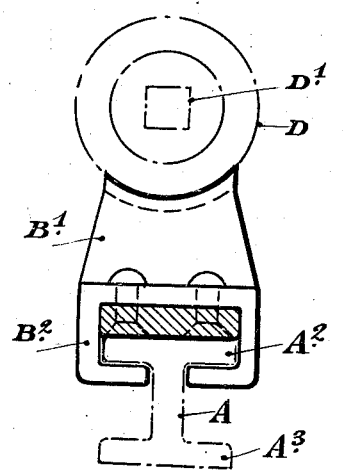
INVENTOR.
Pierre Gouge.
BY Cameron, Kerkam & Sutton.
ATTORNEYS.

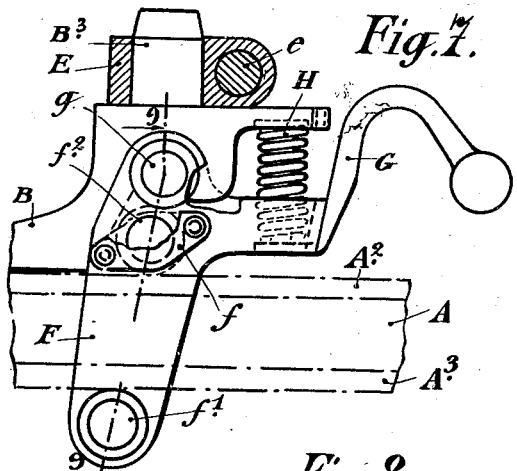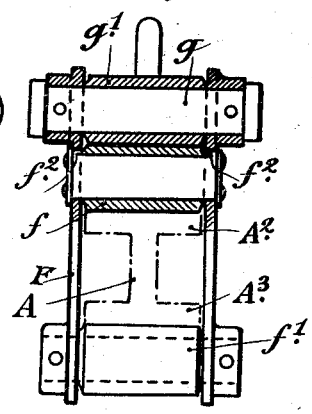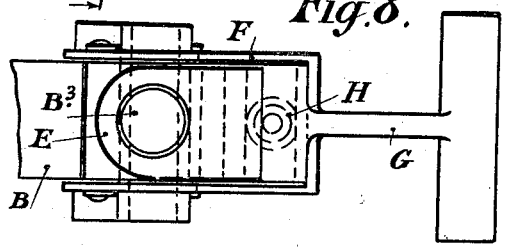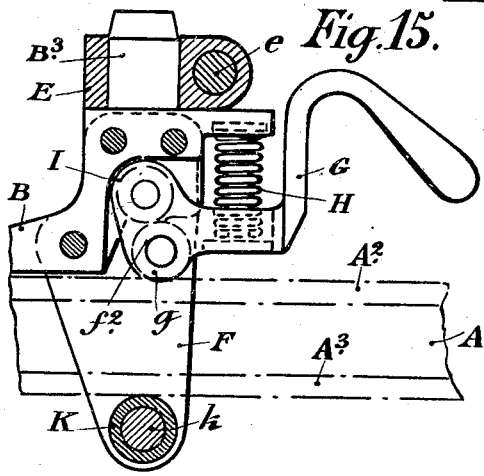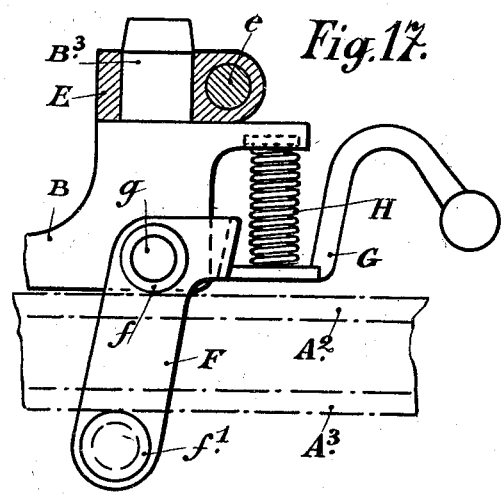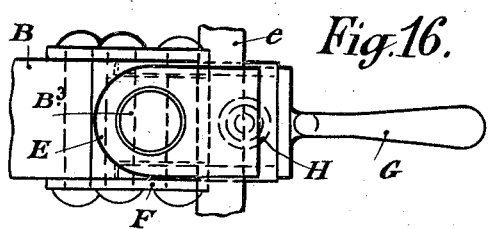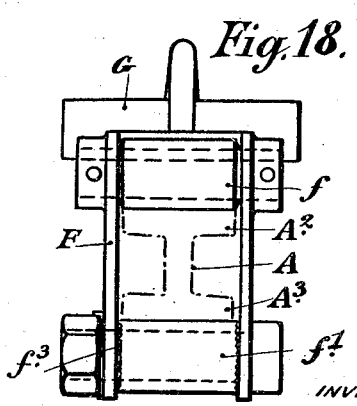

May 10, 1932.   P. GOUGE   1,857,686
DEVICE FOR AUTOMATICALLY ADVANCING PERFORATING HAMMERS BY SLIDING ON A SUPPORT
Filed Feb. 8, 1930   6 Sheets-Sheet 4

INVENTOR
Pierre Gouge.
BY
Cameron, Kerkam & Sutton.
ATTORNEYS.

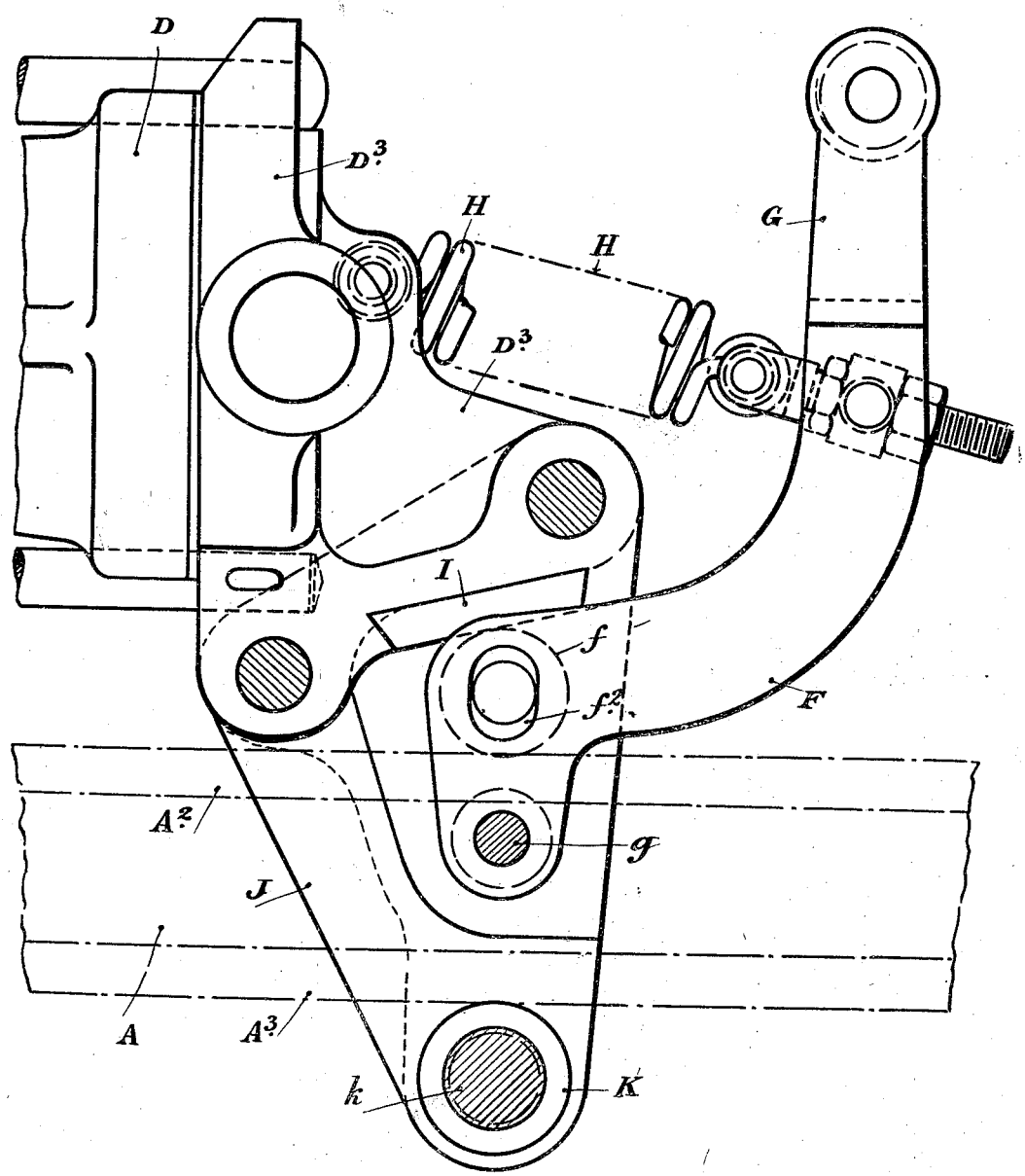

May 10, 1932.  P. GOUGE  1,857,686
DEVICE FOR AUTOMATICALLY ADVANCING PERFORATING HAMMERS BY SLIDING ON A SUPPORT
Filed Feb. 8, 1930   6 Sheets-Sheet 6

INVENTOR.
Pierre Gouge.
BY
Cameron, Kerkam & Sutton.
ATTORNEYS.

Patented May 10, 1932

1,857,686

UNITED STATES PATENT OFFICE

PIERRE GOUGE, OF PARIS, FRANCE, ASSIGNOR TO SOCIETE METALLURGIQUE DE NORMANDIE, OF PARIS, FRANCE, A LIMITED JOINT-STOCK COMPANY OF FRANCE

DEVICE FOR AUTOMATICALLY ADVANCING PERFORATING HAMMERS BY SLIDING ON A SUPPORT

Application filed February 8, 1930, Serial No. 426,992, and in France November 12, 1929.

Devices are known for securing the automatic advance of perforating hammers by sliding on a support under the effect of the reaction which tends to bring back the piston or striking member of the hammer, the support being secured by means of a beak in the wall or surface to be perforated.

This known device necessitates a locking means normally preventing the recoil of the hammer while permitting its gradual automatic advance. Up to the present time these locking actions have been obtained by means of complicated ratchet mechanisms which do not provide a continuous advance and necessitate the provision of teeth on the support or on the hammer. Moreover, in order to prevent the movement of advance from occurring solely in the case when the possible displacement corresponds to a tooth of the ratchet multiple ratchet mechanism have been provided, the only effect of which was to complicate the principle of the method of locking itself.

The present invention relates to improvements in the above mentioned automatic advancing devices. These improvements are essentially characterized by the feature that the locking is obtained by means of a wedging member carried by or guided upon a lever pivoting around a shaft of the carriage or of the hammer, the said member being automatically held wedged between the support and the carriage or the hammer by the action of a compression or tension spring acting between the said lever and a fixed point taken on the carriage or on the hammer, the pivotal movement of the lever for disengagement being obtainable only under the effect of the reaction which produces the advance of the hammer or by hand operation.

Various forms of construction of the invention are illustrated by way of example in the accompanying drawings.

Figures 1 to 6 inclusive show a first form of construction of the invention in which Figures 1 and 1a constitute a longitudinal elevation showing the hammer carrying carriage in the working position.

Figures 2 and 2a constitute corresponding plan views of the construction shown in Figures 1 and 1a.

Figures 3, 4 and 5 are sections taken along the lines 3—3, 4—4 and 5—5 respectively in Figure 1.

Figure 7 is a longitudinal elevation of a portion of a modification of the embodiment of the invention shown in Figures 1–6.

Figure 8 is a plan view of the construction shown in Figure 7.

Figure 9 is a section taken along line 9—9 in Figure 7.

Figure 13 is a longitudinal elevation of still another embodiment of the invention.

Figure 15 is a longitudinal elevation of another embodiment of the invention.

Figure 16 is a plan view of the construction shown in Figure 15.

Figure 17 is a longitudinal elevation of a still further modification of the invention.

Figure 18 is an end view of the construction shown in Figure 17.

Figure 1:
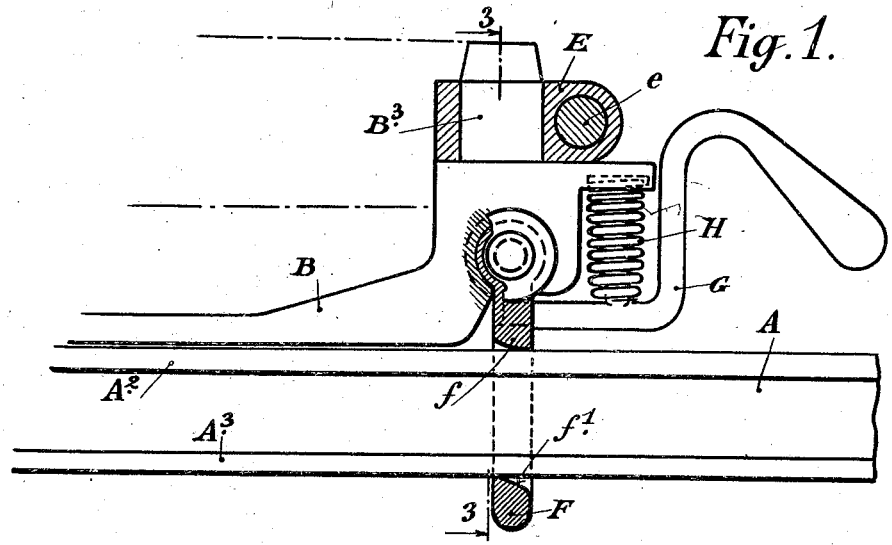
Figure 2:
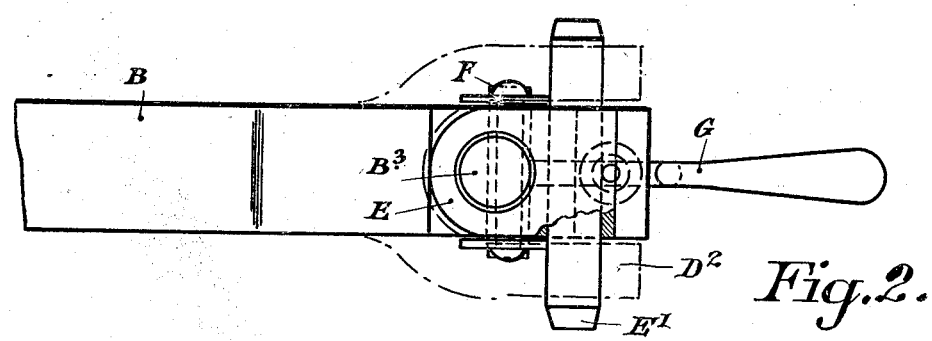

In these figures, A is a support having an I-shaped cross section on which is guided the carriage B carrying the hammer. The support A is provided at its forward end with a beak $A^1$ for fixing it in the hole $c$ formed in the wall or cutting face C. The carriage B in this example is provided at its front end with a cradle $B^1$ on which is carried the hammer B the contour of which is shown in dot and dash lines in Figure 1. The carriage B is guided on the upper flange $A^2$ of the support beam by a C-shaped sole plate $B^2$ rigid with the cradle $B^1$. The cutter or drill $D^1$ of the hammer may in addition be guided in a support $A^4$ projecting from the front end of the support beam. The hammer may, for ease in placing it in position or withdrawing it, be mounted on the carriage B by means of a swivel connection.

As shown in the drawings, this swivel connection is formed by a universal joint member comprising a shackle, or ring E engaged by a pin $B^3$ projecting from the rear end of the carriage. The shackle E is provided with a part tangential to this ring having a hole $e$ for the passage of a pin $E^1$ which also passes through holes formed in the projecting arms $D^2$ forming the handle of the usual hammers. The hammer is thus rendered movable round the spindle $E^1$ for mounting and dismounting. It is in addition movable with the shackle E round the pin $B^3$ of the carriage in a plane passing through the axis of the said spindle.

Figure 3:
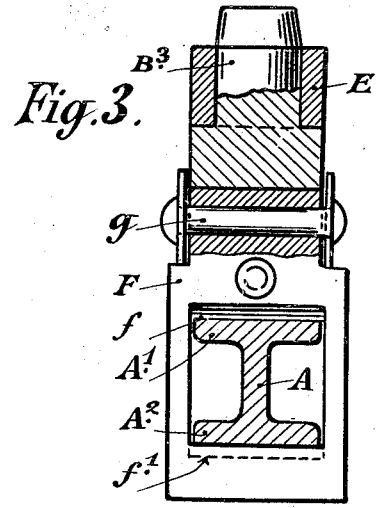
Figure 6:
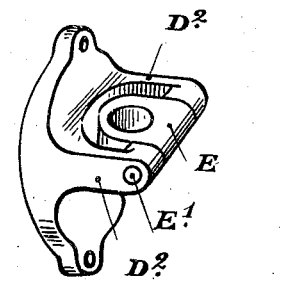
Figure 6 is a perspective view of a device for mounting the hammer on the automatically advancing carriage.

On the carriage B is mounted the wedging member F, which in this first example is carried by a lever G terminating in an operating handle. The lever pivots round a shaft $g$ journalled in the carriage B. The wedging member proper F is, as clearly shown in Figure 3, constructed in the form of a frame surrounding the support beam A. The transverse sides of the frame form curved surfaces $f$, $f^1$, which, as shown in Figure 1, are combined in such a way as to form gripping wedges when the lever tends to be lowered by a deflection of the frame F from its vertical position. Normally the frame is held in the vertical clamping position by a compression spring H which bears at its lower end on the lever G and at its upper end on a projection formed on the head of the carriage.

The return movement of the striking member of the hammer tends to advance the whole of the hammer and carriage with respect to the frame until the grip is released at which time the frame will also advance. However any recoil movement of the carriage and frame is prevented by the frame F being wedged on the support beam A.

Whatever be the advance which the arrangement B—D tends to make, this advance can take place freely subsequent upon each blow on the drill. Moreover, as soon as the advance has taken place, the arrangement B—D formed by the carriage and hammer, is immediately rendered stationary under the action of the spring H which constantly tends to return the frame to its clamped position.

If it is desired to remove the hammer it is sufficient to operate the handle of the lever G in order to raise the frame F. The said arrangement can then be moved back on the support and, after the drill has been disengaged from the cutting face, the hammer can be removed.

Figures 7, 8 and 9 show in elevation, plan and cross section along the line 9—9 in Figure 7 respectively, a modification of the embodiment described above. The figures only show one part of the support beam and of the hammer carrying carriage with the assembly bolt.

In this modification, the curved combined surfaces, which secure the wedging of the carriage B on the support beam A, are formed by two rollers $f$ and $f^1$. One of these rollers $f$ bears upon the upper flange $A^2$ of the support beam. It is guided by its shaft in slots $f^2$ formed in the coupled side plates of the frame F so as to be constantly retained between the flange $A^2$ of the beam and the roller $g^1$ mounted upon the pivot $g$ of the lever G. The other roller $f^1$ has its axis situated in the plane passing through the axis of the roller $f$ and through the axis of the pivot $g$ of the lever. It bears beneath the lower flange $A^3$ of the support beam in front of the point at which the roller $f$ bears on the flange $A^2$.

The spring H, arranged as in the preceding example, constantly tends to keep the roller $f$ in contact with the flange $A^2$ of the support beam, the axis of the roller being situated at the lower end of the slots $f^2$. A wedging action preventing any recoil of the carriage and of the hammer carried by the latter is thus secured on account of the clamping of the roller $f$ on the flange $A^2$ and of the roller $f^1$ on the roller $A^3$, the recoil tending to increase the gripping action. Any movement of advance of the carriage will tend to make the roller $f$ advance with respect to the roller $f^1$ and rotate lever G compressing the spring and releasing the grip so that the carriage and frame advances, but upon a force being applied in the opposite direction the frame will again grip the support.

Figure 10:
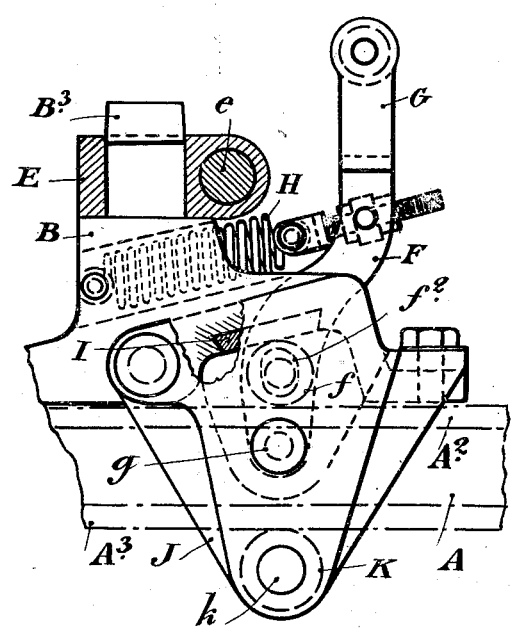
Figure 10 is a longitudinal elevation of another embodiment of the invention.
Figure 12:
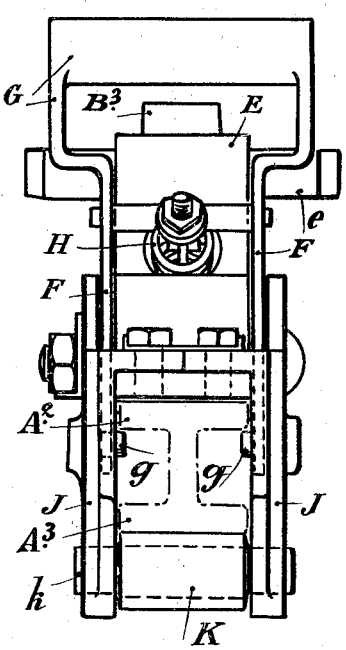
Figure 12 is an end view of the construction shown in Figure 10.
Figure 11:
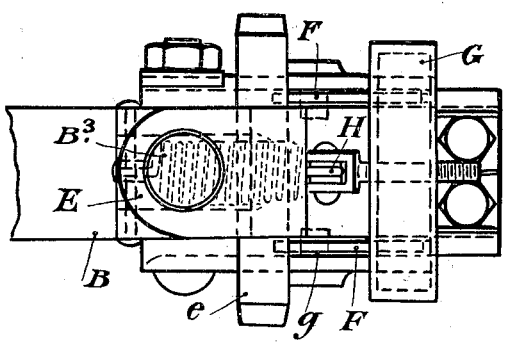
Figure 11 is a plan view of the construction shown in Figure 10.

Figures 10, 11 and 12 show in longitudinal elevation, in plan and in end view respectively another constructional example of the invention. In this example the wedging of the carriage B on the support beam A is obtained by a single member such as a roller $f$ guided in the coupled plates F forming the lever F—G pivoted to the carriage. The roller $f$ bears on the one hand upon the upper flange $A^2$ of the support beam A, and on the other hand on a wedging surface I carried by or formed upon the carriage. In the example shown, this wedging surface I, which is arranged in such a manner that its plane when extended cuts the flange $A^2$ of the support beam in front of the roller $f$, is formed on a separate plate secured by a dove-tailed joint formed in the carriage B. The pivot of the lever F—G is formed by two trunnions $g$ forming projections on two plates J rigid with the carriage B between which the support beam A is engaged. These same plates carry the spindle k of a guide roller K, which spindle is preferably placed vertically below the pivot of the lever. A tension spring H attached to one end of the carriage B and at the other end to the lever F—G, constantly tends to secure the clamping of the roller f between the wedging surface I and the upper flange A² of the support beam. Any movement of recoil of the arrangement formed by the carriage and the hammer tends to increase the gripping action while, on the other hand, a movement of advance of the hammer is always obtained automatically under the effect of the reaction consequent upon the return of the striking member, this advance being rendered possible on account of a space between the surface I and the roller f guided in the slots f² provided, as in the preceding example, in the side plates of the lever F.

Figure 14:
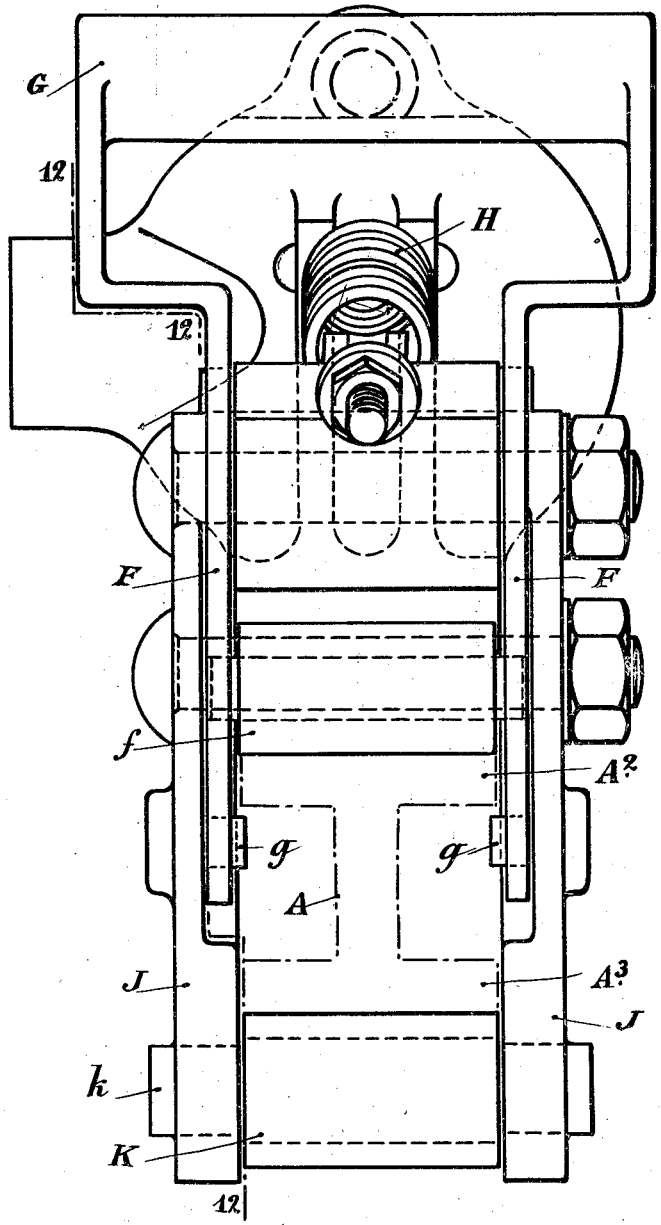
Figure 14 is an end view of the construction shown in Figure 13.

Figures 13 and 14 show a modification in which the guidance on the support is obtained by members carried directly by the hammer, while in the preceding examples these members were carried by the carriage body. The hammer carries at the front a guiding slideway analogous to the slot B², shown in Figure 4. At the rear a plate carrying the wedging surface I is fixed in a member D³ fitted on the head of the hammer, and the hammer is guided by means of a system of two plates J assembled on this head piece, and which is entirely analogous to the guiding arrangement which, in the preceding example, was carried by the carriage. The lever F—G is pivoted to these side plates at g and the wedging member f is guided by its spindle in slots f² formed in the lever exactly as in the preceding example. The spring H is in this case attached by one end to the lever and by the other end to the member D³ fitted on the hammer.

Figures 15 and 16 show respectively in elevation and in plan a modification in which the wedging surface carried by the carriage is formed by a roller I mounted on the pivot g of the lever F—G, the wedging member f being formed by a roller guided in the slots f² in the lever which slots are situated in a plane passing through the pivot and inclined backwards with respect to the latter. A roller K carried by the plate J serves to complete the guiding of the carriage. The gripping action is normally secured by a compression spring H.

Figures 17 and 18 show in elevation and in end view respectively, a form of construction analogous to that shown in Figures 7 and 9 and in Figures 1 to 6.

The wedging member in this example is still formed on a frame F rigid with the operating lever G and surrounding the support beam. This wedging is obtained on the one hand between the support beam and a roller f mounted on the pivot g of the arrangement F—G bearing on the upper flange of the support beam. On the other hand a roller f¹ forming the lower transverse side of the frame F bears against the lower face of the beam, this roller being pressed on the longitudinal sides of the frame by ribs f³ formed on the faces of the said roller, the support for the locked roller f¹ being obtained in front of the support for the movable roller f. The device comprises, as shown in the drawings an arrangement like that shown in Figures 1 to 6 and Figures 7 to 9, in which the compression spring H acts between the lever G and a projection on the carriage B.

I claim:

1. In an apparatus for automatically advancing perforating hammers, the combination of a stationary support, a carriage slidably mounted on said support, a hammer mounted on the carriage and attached thereto, and means for locking the hammer and carriage assembly on the support during recoil comprising a hand-operated lever pivotally mounted on the carriage, a wedging member mounted on the lever, and a spring for automatically holding the wedging member in wedged position between the support and the hammer and carriage assembly, said wedging member comprising a frame having cooperating curved surfaces formed on the opposite inner sides of the frame, said frame surrounding the support with the curved surfaces adapted to bear on the opposite horizontal surfaces of the support, said lever and frame being rigidly connected and said spring positioned between a projection on the carriage and hammer assembly and the said lever so that the frame is normally maintained in wedging position and locking the carriage and hammer assembly.

2. In an apparatus for automatically advancing perforating hammers, the combination of a stationary support, a carriage slidably mounted on said support, a hammer mounted on the carriage and connected thereto by a universal joint member having a pair of axes at right angles to one another whereby said hammer may be moved in a plurality of planes independently of said carriage, a manually operated lever pivotally mounted on the carriage, and a locking device operatively connected to said lever, the movement of the hammer being independent of the lever and locking device due to the universal joint connection between the hammer and the carriage.

3. In an apparatus for automatically advancing perforating hammers, the combination of a stationary support, a carriage slidably mounted on said support, a hammer mounted on said carriage, and a gripping means for preventing any recoil of the carriage, said gripping means comprising a frame member pivotally attached to the carriage and surrounding the support, a roller journaled to the carriage concentric with respect to the pivot of the frame, a second roller loosely journaled in the frame adjacent the first mentioned roller and a spring for moving the frame about its pivot so that the roller loosely carried by the frame will wedge between the stationary roller and support preventing any recoil of the carriage.

4. In an apparatus for automatically advancing perforating hammers, the combination of a stationary support, a carriage slidably mounted on said support, a hammer mounted on said carriage, and a locking means for preventing any recoil of the carriage, said locking means comprising a lever pivotally attached to the carriage and having a frame at one end surrounding the support and a handle at the other end, a gripping roller at the bottom of the frame in contact with the underside of the support, a roller journaled in the carriage, and a movable roller loosely journaled in the frame between the stationary roller and top of the support, and a spring means for rotating the lever about its pivot so that the roller loosely journaled in the frame will wedge between the stationary roller and top of the support for preventing any recoil of the carriage, but adapted to be released by the handle for retracting the hammer.

5. In apparatus for automatically advancing perforating hammers, the combination of a stationary support, a carriage slidably mounted on said support, a hammer mounted on the carriage and connected therewith, and means for preventing recoil of the carriage including an inclined surface on the carriage, a frame pivotally mounted on said carriage, a pair of rollers journalled in said frame on opposite sides of said support, and resilient means tending to wedge one of said rollers between the inclined surface of the carriage and the support.

6. In an apparatus for automatically advancing perforating hammers, the combination of a stationary support, a carriage slidably mounted on said support, the carriage being provided with a forward guiding member and cradle and a rear guiding member and abutment post, a hammer mounted on the carriage that is supported by the cradle and connected to the abutment post by a swivel connection, said connection allowing a rotating movement but preventing sliding movement relative to the carriage, and means for preventing recoil of the carriage including an inclined surface on the carriage, a frame pivotally mounted on said carriage, a pair of rollers journalled in said frame on opposite sides of said support, and resilient means tending to wedge one of said rollers between the inclined surface of the carriage and the support.

7. In an apparatus for automatically advancing perforating hammers, the combination with a stationary support, a carriage slidably mounted on the support, a hammer mounted on said carriage, and locking means for preventing any recoil of the carriage, said means comprising a frame member pivotally mounted on said carriage and surrounding the support, said frame having a roller at the lower part for contacting with the lower part of the support and an inclined surface extending to one side of the pivotal connection, and a spring pressed roller between the inclined surface and top of the support for firmly wedging the frame on the support and preventing any recoil of the carriage.

8. In an apparatus for automatically advancing perforating hammers, the combination with a stationary support in the form of an I section, a carriage slidably mounted on said support, a hammer mounted on said carriage, and a locking means for preventing any recoil of the carriage, said means comprising a frame pivotally connected to the carriage and surrounding the support, said frame being provided with a roller at the lower part thereof for engagement with the lower surface of the support and an inclined surface extending from one side of the pivot, a bifurcated lever having rollers for gripping the under part of the top web of the support, and a wedging roller positioned between the support and inclined surface of the frame, and a spring for moving the lever so that the rollers at the end of the lever will act as a fulcrum and force the wedging roller between the inclined surface and support so that the frame member will be firmly gripped on the support.

9. In an apparatus for automatically advancing perforating hammers, the combination of a stationary support, a carriage slidably mounted on said support, said carriage having a forward guiding member provided with a cradle and a rear guiding member having a projecting post, a hammer mounted on said carriage and supported in said cradle, said hammer being connected to said carriage by a universal joint member engaging said post as one of its axes and having another axis at right angles thereto whereby said hammer may be moved in a plurality of planes independently of said carriage, means for preventing recoil of said carriage, and manual means for releasing said last named means to permit backward movement of said carriage relative to said support.

10. In an apparatus for automatically advancing perforating hammers, the combination of a stationary support, a carriage slidably mounted on said support, a hammer mounted on the carriage, and means for swivelly connecting said hammer to said carriage comprising a pin projecting from said carriage, a shackle member carried by said hammer and engaging said pin whereby said hammer may be moved independently of said carriage in a plane perpendicular to the axis of said pin, and a pivotal connection between said hammer and said shackle member having its axis perpendicular to the axis of said pin whereby said hammer may be moved independently of said carriage in a plane through the axis of said pin.

In testimony whereof I have signed this specification.

PIERRE GOUGE.